United States Patent [19]
Yun

[11] Patent Number: 6,008,870
[45] Date of Patent: Dec. 28, 1999

[54] LIQUID CRYSTAL DISPLAY

[75] Inventor: Hee Young Yun, Kyungsangbook-do, Rep. of Korea

[73] Assignee: LG Electronics Inc., Seoul, Rep. of Korea

[21] Appl. No.: 09/048,320

[22] Filed: Mar. 26, 1998

[30] Foreign Application Priority Data

Apr. 10, 1997 [KR] Rep. of Korea ........................ 97-13269

[51] Int. Cl.⁶ ........................... G02F 1/1333; G02F 1/335
[52] U.S. Cl. ................................................. 349/58; 349/67
[58] Field of Search .................................. 349/58, 59, 60, 349/67, 113, FOR 113

[56] References Cited

U.S. PATENT DOCUMENTS

| | | | |
|---|---|---|---|
| 4,855,646 | 8/1989 | Peckitt et al. | 315/175 |
| 5,146,354 | 9/1992 | Plesinger | 349/58 |
| 5,280,372 | 1/1994 | Horiuchi | 349/58 |
| 5,764,322 | 6/1998 | Mamiya et al. | 349/113 |
| 5,866,759 | 3/1999 | Mashino et al. | 349/113 |

FOREIGN PATENT DOCUMENTS 5-150233   6/1993   Japan ...................................... 349/113

*Primary Examiner*—William L. Sikes
*Assistant Examiner*—Walter Malinowski
*Attorney, Agent, or Firm*—Morgan, Lewis & Bockius LLP

[57] ABSTRACT

A liquid crystal display including a lamp, an U-shaped lamp housing surrounding the lamp, and a plastic housing fixed to the lamp housing. A grounding plate is placed between the plastic housing and the lamp housing, wherein the grounding plate has a first portion, placed between the lamp housing and the plastic housing and in contact with a portion of the lamp housing, and a second portion having an elastic portion that protrudes outward. A supporting frame is in contact with the plastic housing and the second portion of the grounding plate.

20 Claims, 7 Drawing Sheets

4b
Conventional Art
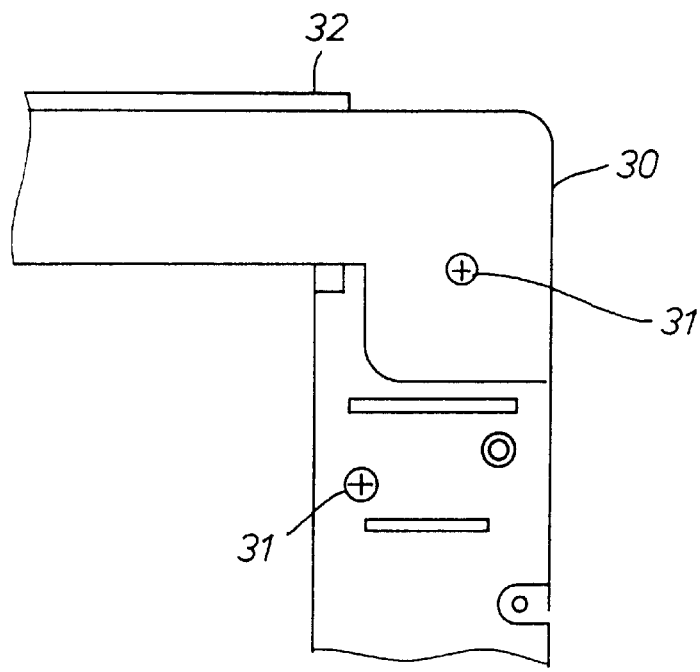
Fig.4a
Conventional Art
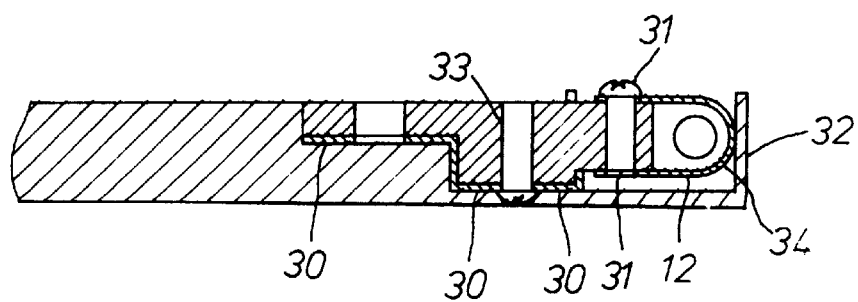

LIQUID CRYSTAL DISPLAY

This application claims the benefit of Korean Patent Application No. 97-13269, filed in Korea on Apr. 10, 1997, which is hereby incorporated by reference.

BACKGROUND OF THE INVENTION

1. Field of the Invention

The present invention relates to a liquid crystal display (LCD), and more particularly, to a housing assembly of an LCD.

2. Discussion of the Related Art

As shown in FIG. 1, a conventional LCD includes a liquid crystal panel 10, a fluorescent lamp 11, a U-shaped lamp housing 12 enclosing the fluorescent lamp 11, a light diffusing sheet 13, which is attached to one surface of the liquid crystal panel, a first prism 14, a second prism 15, a protecting sheet 18, a light guide 16, a light reflecting sheet 17, a first frame 21 holding the components in place, and the display area 19. The display 19 includes two transparent substrates facing each other and having polarizing plates on their outer surfaces, and liquid crystal injected between the two transparent substrates. The LCD further includes a driving circuit 20 that operates the display area. As shown in FIG. 2, the first frame 21 is enclosed within a second frame 22.

The LCD is driven as described below. FIG. 3 is a cross-sectional view showing the light guide 16. As shown in FIG. 3, one side of the light guide 16 is thicker than an opposite side of the light guide 16. The fluorescent lamp 11 is fastened to the thicker side of the light guide 16. When the fluorescent lamp 11 is turned on, light 23 is reflected from the lamp housing 12 and is directed towards the light guide 16 and to a portion of the light guide 16 further from the fluorescent lamp 11 that is not in contact with the fluorescent lamp 11. Accordingly, the light 23 spreads throughout the light guide 16 and reaches the display area 19 (FIG. 1) by the light diffusing sheet 13. Thin film transistors formed on the liquid crystal panel control pixels based on signals from the driving circuit 20, as shown in FIG. 1, which results in the selective transmittance of the light 23. A group of pixels transmits the light 23 and forms an image on the display area of the LCD.

Electromagnetic waves and static electricity produced by a current supplied to the fluorescent lamp 11 often cause malfunction of the LCD. To prevent the formation of current and static electricity, a grounding plate is attached to the lamp housing 12. The grounding plate is formed in contact with the first and the second frames 21 and 22. Connection of the grounding plate to the first and second frames 21 and 22 is accomplished through a screw-hole 33 formed in the first frame 21. The grounding plate is screwed to the first frame 21 through the screw-hole 33. As a result, the electromagnetic waves and the electromagnetic field formed by the current supplied to the fluorescent lamp 11 are grounded through the grounding plate attached to the lamp housing 12.

As shown in FIG. 4A illustrating a plan view, the grounding plate of the conventional LCD is placed at a corner of a front surface of a frame 32. In addition, a screw 31 is used to fix the grounding plate 30 as shown in FIG. 4B illustrating a side view. Therefore, the thickness of the conventional LCD is as thick as the length of the screw. Furthermore, the display area of the LCD is reduced because the screw-hole 33 is formed in the front surface of the LCD for fixing the grounding plate.

SUMMARY OF THE INVENTION

An object of the present invention is to provide an LCD that is thinner than a conventional LCD by forming the grounding plate as one body and by fixing the grounding plate to a lamp housing without using a screw.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display including a lamp, a U-shaped lamp housing that surrounds the lamp, a plastic housing fixed to the lamp housing, a grounding plate, including a first portion placed between the lamp housing and the plastic housing and in contact with a portion of the lamp housing and a second portion having an elastic portion that protrudes outward, and a supporting frame in contact with the plastic housing and the second portion of the grounding plate.

In another aspect A housing assembly and grounding plate for a liquid crystal display, including a first frame, a second frame a grounding plate positioned between the first frame and the second frame. The grounding plate includes a first portion in contact with the first frame, a second portion in contact with the second frame, and a third portion adapted to receive a supporting portion of the second frame and capable of fixing the grounding plate. A a supporting frame is in contact with the second frame and the second portion of the grounding plate, wherein the first frame is adapted to receive and contact the first portion of the grounding plate when the first frame is enclosed by the second frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A and 4B are a plan view and a side view showing a grounding plate of a conventional LCD;

DETAILED DESCRIPTION OF THE PREFERRED EMBODIMENTS

Reference will now be made in detail to the preferred embodiments of the present invention, examples of which are illustrated in the accompanying drawings.

Figure 1:
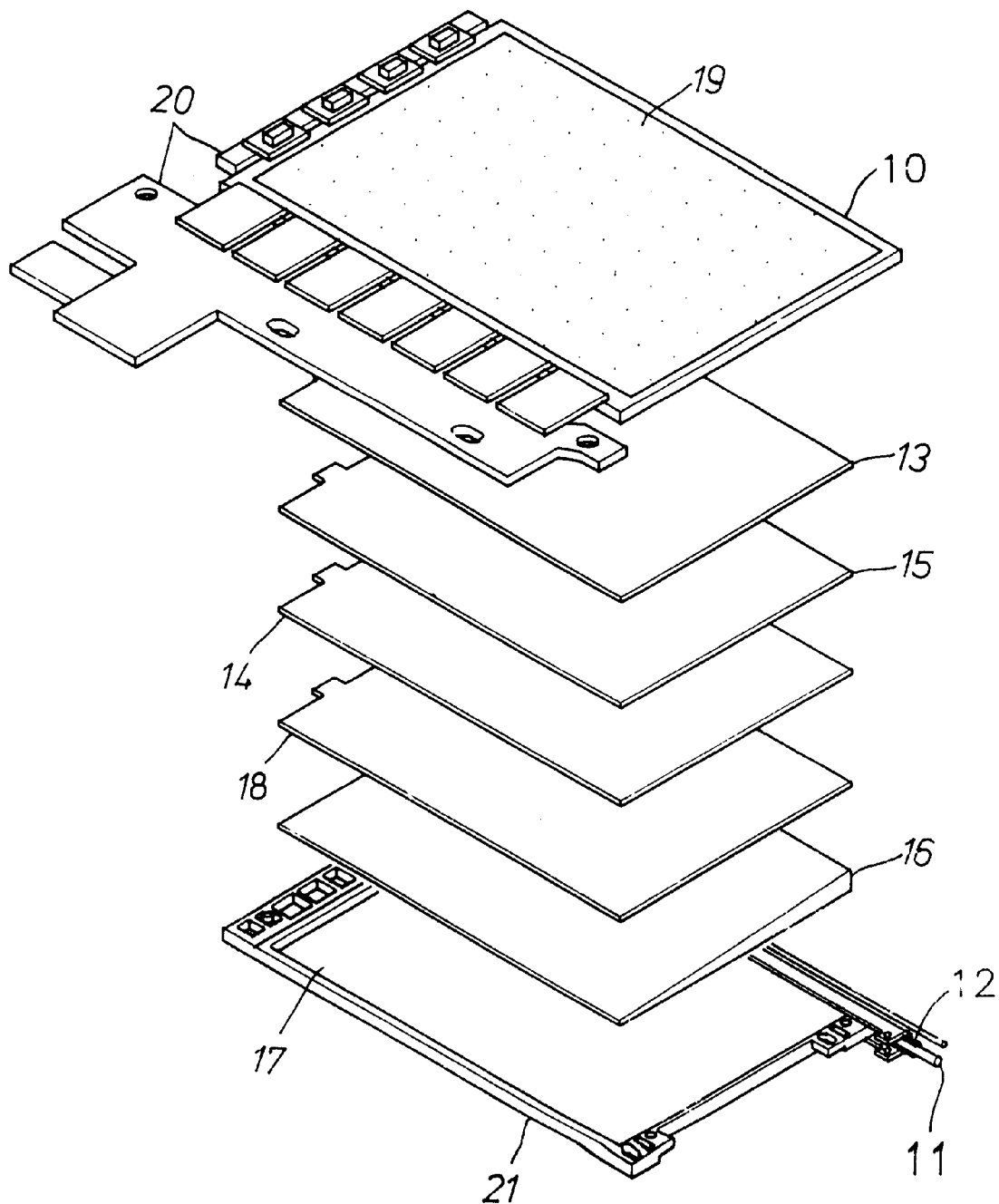
FIG. 1 is a three-dimensional view showing components of a conventional LCD.
Figure 2:
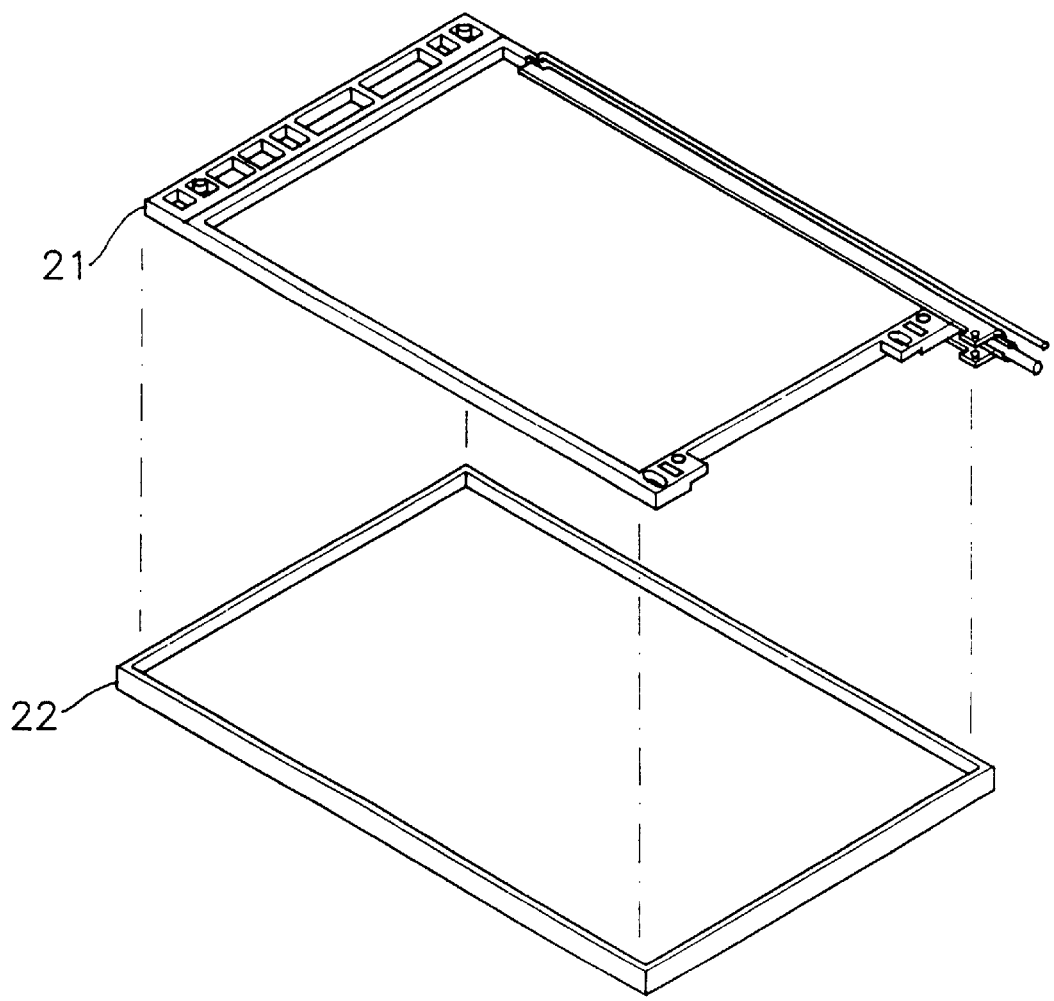
FIG. 2 shows frames of the conventional LCD.
Figure 3:
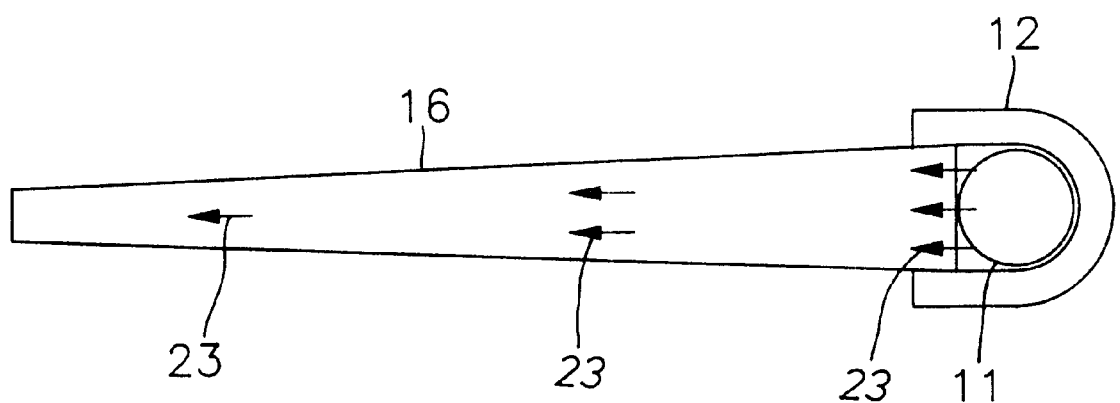
FIG. 3 is a cross-sectional view showing a light guide and a fluorescent lamp of the present invention.
Figure 5:
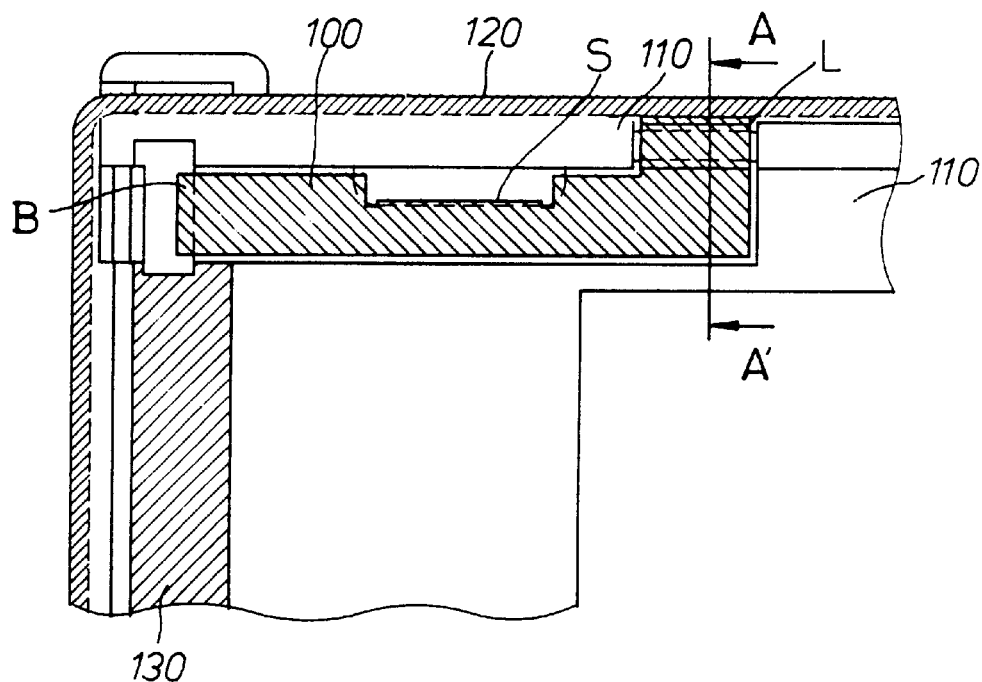
FIG. 5 is a perspective plan view showing a grounding plate of an LCD according to the present invention.

As shown in FIG. 5, an LCD of the present invention, includes a first frame 110 formed of plastic or a similar material, a second frame 120 formed of metal and a grounding plate 100 positioned between the first frame 110 and the second frame 120. The grounding plate 100 (that is in contact with the lamp housing 130) is formed as one body and is fixed to the first plastic frame 110 together with the lamp housing. The second frame 120 encloses the first frame 110. As shown in FIG. 5, a first portion L of the grounding plate 100 comes in contact with an inner surface of the second frame 120 and completes the grounding path. The first portion L of the grounding plate 100 is in contact with the inner surface of the second frame 120 and is resilient so that it is capable of being bent at an acute angle towards the side of the first frame 110 before the first frame 110 is enclosed by the second frame 120, as shown in FIG. 5. The first portion L of the grounding plate 100 is pressed down and into contact with the second frame 120 when the first frame 100 is enclosed by the second frame 120.

Figure 6:
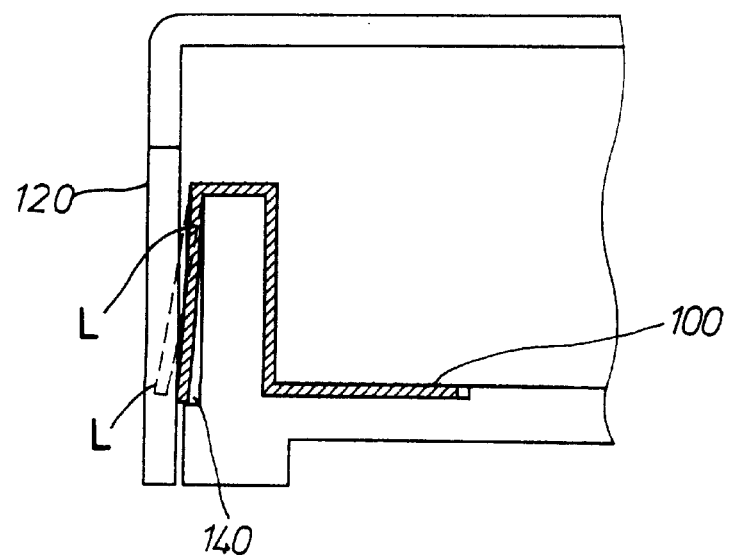
FIG. 6 is a perspective cross-sectional view showing a portion of grounding plate of the LCD according to the present invention.

FIG. 6 shows a cross-sectional view taken along line A–A' of FIG. 5. The first portion L is resilient, therefore, the first portion L moves toward a sunken portion 140 of the first frame 110 when the second frame 120 encloses the first frame 110, and springs or extends from the sunken portion 140 when the second frame 120 is detached. A second portion B of the grounding plate 100, and a third portion S of the grounding plate 100 are fixed by the first frame 110 and are in contact with the lamp housing 130.

Figure 7:
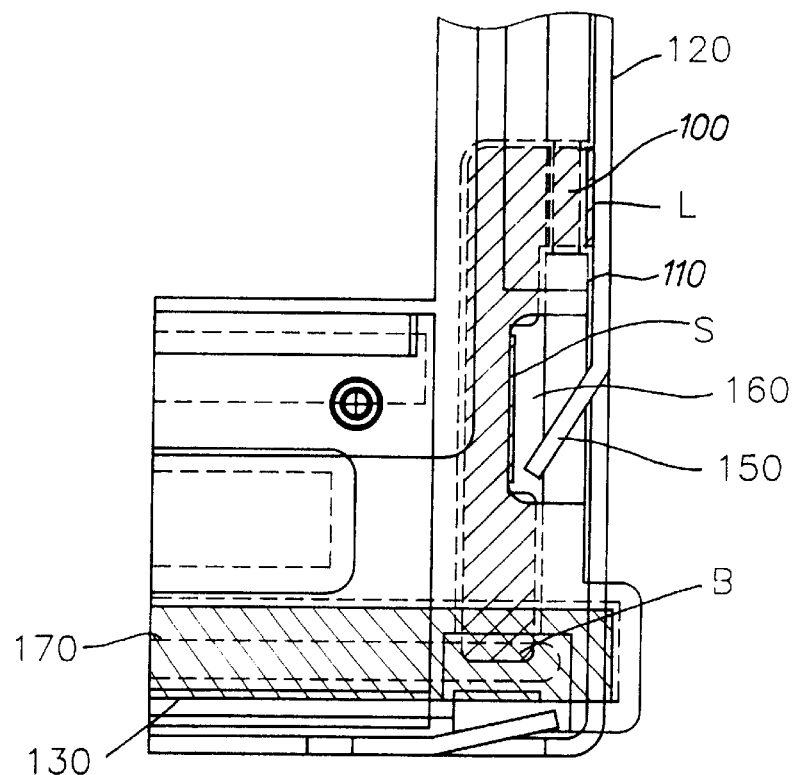
FIG. 7 is perspective view showing a rear of the LCD and the grounding plate according to the present invention.

FIG. 7 shows a rear view of the liquid crystal display in which the grounding plate 100 is mounted. The second portion B of the grounding plate 100 is in contact with the lamp housing 130 and the first portion L is in contact with the second frame 120. The third portion S of the grounding plate 100 functions to hold the grounding plate 100 in place and is capable of being folded at a sunken portion 160 of the grounding plate 100 where a supporting part 150 of the second frame 120 is placed. The second portion B may be in contact with any portion of the lamp housing 130 that encloses the lamp 170. The first portion L should be disposed such that the first frame 110 contacts the second frame 120. In other words, although the first portion L may be located at any portion along the first frame 110, it must be in contact with the second frame 120.

Figure 8:
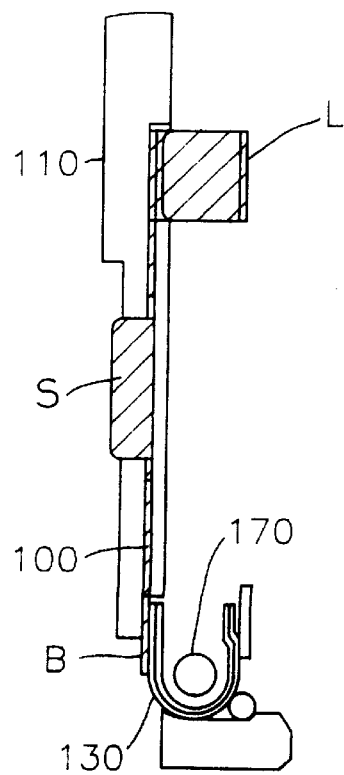
FIG. 8 is a cross-sectional view showing the grounding plate and a lamp housing of the present invention.

FIG. 8 is a cross-sectional view showing the grounding plate 100 in contact with the lamp housing 130 enclosing the fluorescent lamp 170. The third portion S of the grounding plate 100 is bent toward the first frame 110 at a right angle to the side of the first frame 110 and is attached to the first frame 110. In the preferred embodiment, the first portion L is formed to be bent against the side of and to be in contact with the first frame 110. The first portion L is formed at an acute angle to the side of the first frame 110 while the third portion S is formed at a right angle to the side of the first frame 110. The first portion L is disposed at the sunken portion 140, shown in FIG. 6, at the side of the first frame 110.

Figure 9:
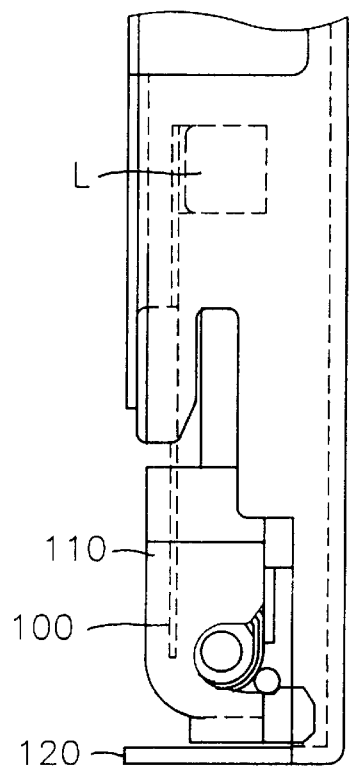
FIG. 9 is a cross-sectional view showing the grounding plate, the lamp housing, and a first and a second frame of the present invention.

FIG. 9 shows the grounding plate 100 when the first frame 110 is enclosed within the second frame 120. When the first frame 100 is enclosed within the second frame 120, the first portion L of the grounding plate 100 is pressed down by the second frame 120 and moves toward the side of the first frame 110. Accordingly, the first portion L forms an electrical connection with the first frame 110 and the second frame 120.

Figure 10:
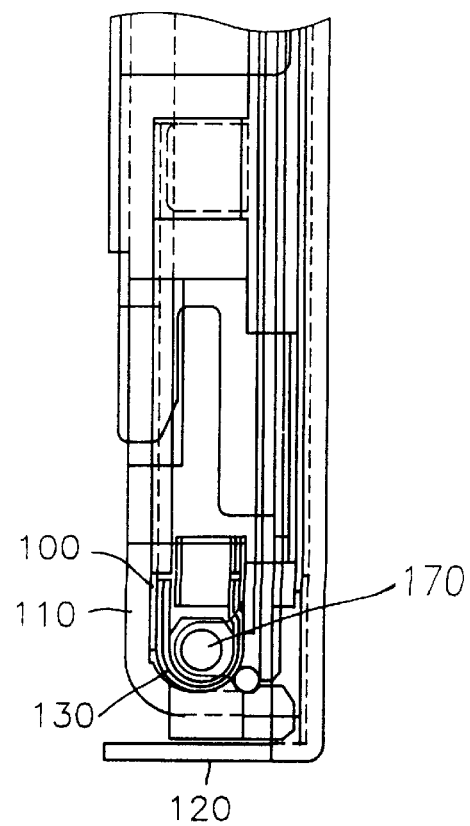
FIG. 10 is a cross-sectional view showing an assembled LCD employing the grounding plate of the present invention.

FIG. 10 shows the grounding plate 100 located between the first frame 110 and the second frame 120 when the LCD is completely assembled.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:

a lamp;

a U-shaped lamp housing surrounding the lamp;

a plastic housing fixed to the lamp housing;

a grounding plate, including a first portion placed between the lamp housing and the plastic housing and in contact with a portion of the lamp housing, and a second portion having an elastic portion protruding outward; and a supporting frame in contact with the plastic housing and the second portion of the grounding plate.

2. The liquid crystal display according to claim 1, wherein the first portion and the second portion of the grounding plate are one body.

3. The liquid crystal display according to claim 2, wherein the supporting frame is made of metal.

4. The liquid crystal display according to claim 2, wherein the first portion of the grounding plate is adapted to form an angle to a side of a first frame.

5. The liquid crystal display according to claim 4, wherein the angle is acute.

6. The liquid crystal display according to claim 2, wherein the first portion of the grounding plate is formed of a resilient material.

7. The liquid crystal display according to claim 1, wherein the first portion of the grounding plate is adapted to form an angle to a side of a first frame.

8. The liquid crystal display according to claim 7, wherein the angle is acute.

9. The liquid crystal display according to claim 1, wherein the first portion of the grounding plate is formed of a resilient material.

10. The liquid crystal display according to claim 1, wherein the supporting frame is made of metal.

11. The liquid crystal display according to claim 1, wherein the lamp is a fluorescent lamp.

12. A housing assembly and grounding plate for a liquid crystal display, comprising:

a first frame;

a second frame;

a grounding plate, being positioned between the first frame and the second frame, the grounding plate including:

a first portion in contact with the first frame;

a second portion in contact with the second frame; and a third portion adapted to receive a supporting portion of the second frame and capable of fixing the grounding plate; and a supporting frame in contact with the second frame and the second portion of the grounding plate, wherein the first frame is adapted to receive and contact the first portion of the grounding plate when the first frame is enclosed by the second frame.

13. The housing assembly and grounding plate for a liquid crystal display according to claim 12, wherein the first portion of the grounding plate is adapted to form an angle to a side of the first frame.

14. The housing assembly and grounding plate for a liquid crystal display according to claim 13, wherein the angle is acute.

15. The housing assembly and grounding plate for a liquid crystal display according to claim 14, wherein the first portion of the grounding plate is formed of a resilient material.

16. The housing assembly and grounding plate for a liquid crystal display according to claim 12, wherein the third portion of the grounding plate is adapted to be folded at the supporting portion of the second frame.

17. The housing assembly and grounding plate for a liquid crystal display according to claim 16, wherein the third portion of the grounding plate is folded at a 90° angle.

18. The housing assembly and grounding plate for a liquid crystal display according to claim 12, wherein the supporting frame is made of metal.

19. The housing assembly and grounding plate for a liquid crystal display according to claim 12, wherein the first portion and the second portion of the grounding plate are formed as one body.

20. The housing assembly and grounding plate for a liquid crystal display according to claim 12, wherein the lamp is a fluorescent lamp.

* * * * *